United States Patent [19]

Grenier

[11] 3,712,585
[45] Jan. 23, 1973

[54] SEALS FOR BALL VALVES
[75] Inventor: Wilfred J. Grenier, Rutland, Mass.
[73] Assignee: General Industries, Inc., Worcester, Mass.
[22] Filed: Aug. 27, 1970
[21] Appl. No.: 67,360

[52] U.S. Cl. .................251/174, 251/172, 251/317
[51] Int. Cl. .............................................F16k 5/20
[58] Field of Search......................251/172, 174, 185

[56] References Cited

UNITED STATES PATENTS

| | | | |
|---|---|---|---|
| 3,401,914 | 9/1968 | Shand | 251/172 |
| 3,486,733 | 12/1969 | Gordon | 251/172 |
| 3,394,915 | 7/1968 | Gacket | 251/174 |
| 3,567,176 | 3/1971 | Johnson | 251/172 X |
| 3,570,811 | 3/1971 | Krushik | 251/174 |

FOREIGN PATENTS OR APPLICATIONS 1,354,265  1/1964  France ...............................251/174

*Primary Examiner*—Harold W. Weakley
*Attorney*—Charles R. Fay

[57] ABSTRACT

A seal and seat construction for the ball of a ball valve including an annular upstream elastomeric seal having a general wedge conformation and an annular spring for holding the same, the spring having an outer peripheral area held by the parts of the housing of the ball valve and an inner offset annular member impinging upon the seal causing it to press against the exterior surface of the ball valve about the inlet opening thereof. There is also a new and improved elastometric seal for the downstream side of the ball including a metal retainer preventing extrusion of the seal material.

1 Claim, 4 Drawing Figures

PATENTED JAN 23 1973

3,712,585

Inventor
Wilfred J. Granzer
By Charles R. Fay,
Attorney

SEALS FOR BALL VALVES

BACKGROUND OF THE INVENTION

The seats for the balls of ball valves usually leak under conditions of wear or high pressure and in the case of ball valves which are made of pressed metal the usual seats of the prior art are completely inadequate to prevent leaking due to the construction of the sheet metal housing members, etc. It is the main object of the present invention to provide a new and improved plastic elastometric seal and seal construction for the upstream side of the ball which will not leak under any conditions. At the same time the invention also contemplates a novel downstream seat seal of a kind which not only is adequate for the purpose but is provided with means preventing extrusion of the plastic material of the seat under conditions of use.

SUMMARY OF THE INVENTION

The present invention provides, especially in a pressed metal valve, an upstream seat seal made of plastic elastometric material such as Teflon. This seal is annular and wedge shaped tapering from a wider edge in the upstream direction to a narrow edge in the downstream direction, and it is tightly pressed against the exterior surface of the ball by means of a special new and improved annular seal holding spring. This spring is held at its periphery by the parts of the housing of the valve and exerts a pressure at the wider end of the elastometric seat tending to wedge it tightly in sealing condition against the surface of the ball. The construction of this annular spring and its complementary seat is such that the greater the downstream pressure the more tightly the same will be held in sealing condition preventing any tendency toward leakage.

The invention also contemplates a downstream ball seat and seal comprising a plastic elastometric specially shaped seat in annular form having a metallic covering or retainer which avoids any tendency to extrusion of the plastic material of the seat in a downstream direction. Also the greater the pressure of the stream, the greater the pressure of the ball against the downstream seat seal.

PREFERRED EMBODIMENT OF THE INVENTION

The parts of the housing of the ball valve here shown are made of pressed metal. There is an upstream pipe connection generally indicted at 10 having a peripheral area at 12 secured to an annular member 14 which extends inwardly from the periphery at 16 terminating in a foot 18 for a purpose to be described. Also there is a pressed metal bonnet or housing member 20 which is secured at the periphery thereof as at 22 with respect to the peripheral edges of the members 12 and 14.

Figure 1:
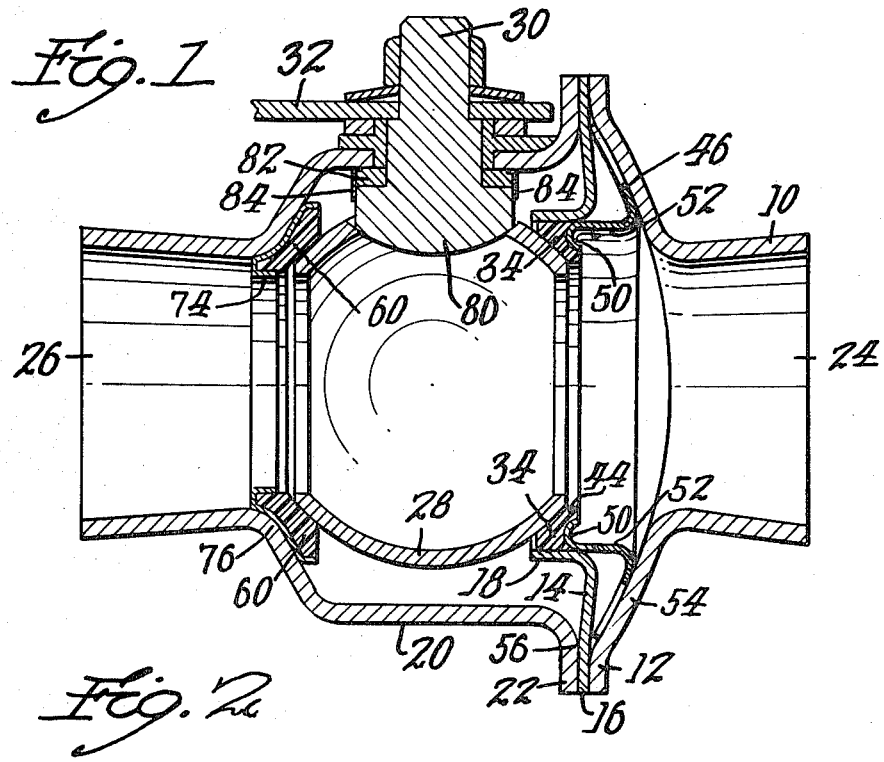
FIG. 1 is a sectional view for a ball valve showing the present invention.

The members 10, 14 and 20 may be welded together in the peripheral edge portions thereof as at 12, 16 and 22 and it will be noted that the upstream pressed metal part 10 is adapted to be connected to a pipe in the area 24, and the same is true as to the downstream area 26 of the bonnet member 20. It should be emphasized that these three parts are all made of pressed metal. The ball illustrated at 28 is provided with a more or less conventional connection or the like 30 having a handle 32 to turn the same between on and off conditions. As shown in FIG. 1 the valve of course is open but a quarter turn of handle 32 will close it as is well known.

Figure 4:
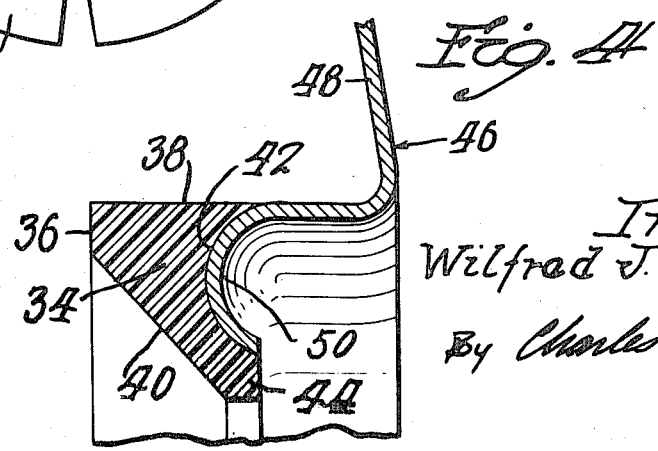
FIG. 4 is a similar view of the upstream seat.

The annular inturned cylindrical portion 18 of the member 14 forms a base for supporting a plastic elastometric seat-seal 34 which as shown in FIGS. 1 and 4 is wedge-shaped having its narrow edge 36 downstream with a flat peripheral area 38 held against the inside surface of the cylindrical foot 18 of the member 14, and an angular or inclined surface 40 which may be originally flat as shown in FIG. 4, but which conforms to the spherical exterior surface of the ball 28 as shown in FIG. 1.

At its upstream or wider edge the plastic seat 34 is provided with a concave annular groove 42 which is preferably closer to and even intersects to some degree the peripheral surface 38 which leaves a kind of arrowhead annulus 44 at the interior surface of the annular seat 34.

Figure 2:
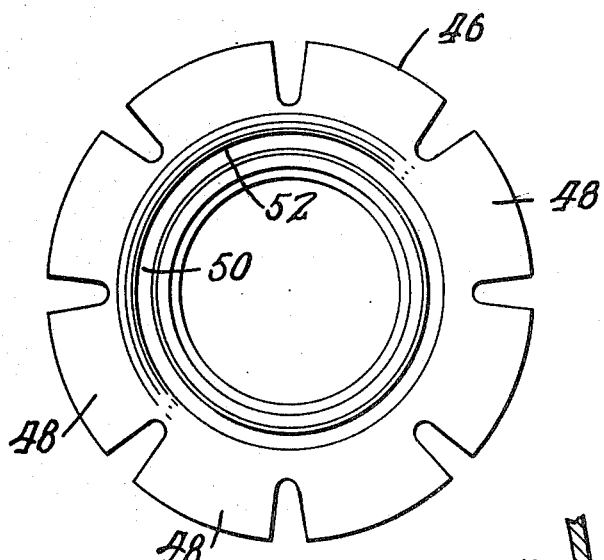
FIG. 2 is a view in elevation on an enlarged scale illustrating the upstream plastic seat spring.
Figure 3:
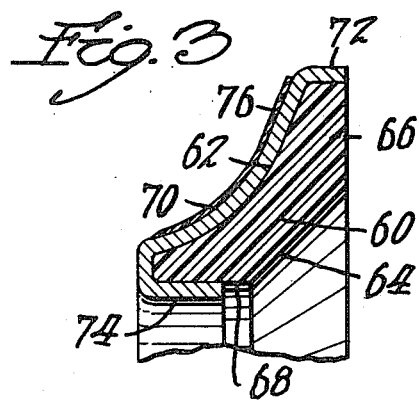
FIG. 3 is a sectional view on an enlarged scale through the downstream seat.

An annular spring member generally indicated at 46, see particularly FIG. 2, is provided with a series of radial projecting fingers 48, 48, these being springy. The entire spring 46 is preferably made of metal or some high impact synthetic material. At its interior surface it is provided with an upstream facing through 50, see especially FIG. 1. This trough extends in a downstream direction being connected by means of the portion 52 of the spring member to the fingers 48, and the fingers 48 are generally held in position between the part 54 of member 10 and part 56 of member 20, both of which extend radially outwardly clamping between them the seal retaining spring. The annular convex groove or cup-shaped member at 50 impinges strongly upon the concave portion at 42 of the elastometric plastic seat-seal 34 as is best shown in FIG. 4.

The spring is considerably offset as to the finger area and the trough to an extent that the fingers and adjacent areas strongly impinge upon the interior surface of part 54 of member 10. Therefore the seal 34 cannot move in the upstream direction under influence of back pressure or reverse flow.

The force of the spring 46 however is in a downstream direction against the concavity at 42 of the seal 34 so that it will be seen that this wedge-shaped seal is constantly urged against the ball insuring that surface 40 shall be distorted slightly to conform thereto, but at the same time the wedge-shaped seal 34 is urged against the foot 18 of the member 41 so that a wedge effect is provided in which the apex of the wedge is constantly urged in a downstream direction compleyely closing off and sealing against any possible leakage between the ball and the foot 18 of member 14. The part 54 acts as a stop preventing any separation of the seal from the ball.

At the downstream side of the valve there is an elastometric plastic seal which is generally indicated at 60. This seal is annular and is of general triangular form in section having a concave downstream surface 62 and an inclined surface 64 which conforms to the exterior surface of the ball 28. It also has a pair of right angular surfaces 66 and 68, surface 66 is radial and surface 68 is in general axially parallel to the stream axis. This seat seal is encased in a metal retainer which has an area at 70 conforming to surface 62, a bent-over tip at 72 at one edge thereof and another bent-over tip 74 of slightly different configuration embracing surface 68.

The metal retainer 70 has a coating 76 of a suitable plastic such as Teflon which bears against the portion 76 of the pressed metal housing 20 and forms a leak-proof seal. The ball 28 presses against the elastometric seat 60 and the greater the downstream pressure on the ball the greater is the pressure to seal against leakage and to maintain the seat 60 in desired position.

At the same time the metal retainer particularly in the area at 74 prevents any tendency to extrusion or fragmentation of the elastometric plastic seat 60 under pressures caused by the operation of the valve.

The key 80 for handle 32 has an elastometric washer 82 with a surrounding keeper ring or sleeve 84 that prevents any tendency of the washer to extrude under pressure.

It will be seen that this invention presents a simple but effective leakproof and long-wearing seat-seal for the ball of a ball valve at both the upstream and downstream sides thereof and that these seals particularly that at 34 are held in position by relatively simple pressed metal parts which are held together in any way desired as by welding or the like. At the same time these parts provide an anchor for the spring 46 which accomplishes the function of firmly holding the elastometric plastic seat 34 against the exterior surface of the ball on the upstream side thereof. Reverse or zero pressures do not affect the sealing action of seal 34 due to the immobility of the finger area of spring 46 and an efficient downstream seal is provided by the Teflon coating at 76.

I claim:

1. A ball valve comprising a housing, a valve member in the form of a ball in said housing, means for moving the ball between open and closed positions, a seat for the ball, said seat being of elastomeric plastic material and being annular in form and having a surface conforming to the ball, said seat having a relatively narrow surface along one side thereof and a relatively wider surface along its opposite side, and an annular spring member held at its outer periphery in said housing and having an annular seat-contacting portion along its inner periphery directly and intimately contacting and pressing against the said wider surface of said seat along an annular contacting area of said surface, said spring being compressed between said outer periphery and said annular seat-contacting portion so as to constantly urge said conforming surface of said seat into intimate contact with said ball, said annular seat-contacting portion of said spring member has an annular convex portion facing said seat, and said seat includes an annular concave groove around said wider surface sized to receive said convex spring portion to define said annular contacting area.

* * * * *